United States Patent
Erle et al.

(10) Patent No.: US 8,460,728 B2
(45) Date of Patent: Jun. 11, 2013

(54) PRESERVED SLICES OF VEGETABLES AND FRUITS AND PROCESSING METHODS

(75) Inventors: Ulrich Erle, Feuerthalen (CH); Roland Lermer, Radolfzell (DE)

(73) Assignee: Nestec S.A., Vevey (CH)

( * ) Notice: Subject to any disclaimer, the term of this patent is extended or adjusted under 35 U.S.C. 154(b) by 545 days.

(21) Appl. No.: 12/373,017

(22) PCT Filed: Jul. 12, 2006

(86) PCT No.: PCT/EP2006/006825
§ 371 (c)(1),
(2), (4) Date: Nov. 2, 2009

(87) PCT Pub. No.: WO2008/006388
PCT Pub. Date: Jan. 17, 2008

(65) Prior Publication Data
US 2010/0055263 A1    Mar. 4, 2010

(51) Int. Cl.
*A23L 1/00* (2006.01)
*A23F 5/00* (2006.01)
*A23K 1/00* (2006.01)
*A23G 3/00* (2006.01)

(52) U.S. Cl.
USPC ............ 426/289; 426/302; 426/615; 426/658

(58) Field of Classification Search
USPC ....................................................... 426/289
See application file for complete search history.

(56) References Cited

U.S. PATENT DOCUMENTS

| | | | |
|---|---|---|---|
| 4,664,924 A * | 5/1987 | Sugisawa et al. | 426/242 |
| 5,645,876 A | 7/1997 | Subramaniam et al. | |
| 6,038,785 A * | 3/2000 | Lawson et al. | 34/145 |
| 6,086,933 A * | 7/2000 | Rockstrom | 426/243 |
| 6,132,794 A * | 10/2000 | Sinha et al. | 426/615 |
| 6,149,959 A * | 11/2000 | Dayley et al. | 426/438 |
| 6,977,090 B2 | 12/2005 | Petcavich | |
| 2003/0194479 A1 | 10/2003 | Takeuchi et al. | |
| 2005/0013910 A1 | 1/2005 | Takeuchi et al. | |

FOREIGN PATENT DOCUMENTS

| | | |
|---|---|---|
| DE | 3443218 | 5/1986 |
| EP | 1541031 | 6/2005 |

OTHER PUBLICATIONS

Lewicki, P. P., Jakubczyk, E., "Effect of hot air temperature on mechanical properties of dried apples," Journal of Food Engineering 64 (2004) 307-314.*

Yang, H., Sakai, N., Watanabe, M., "Drying Model with Non-Isotropic Shrinkage Deformation Undergoing Simultaneous Heat and Mass Transfer," Drying Technology, 19(7), 1441-1460 (2001).*

(Continued)

*Primary Examiner* — Humera Sheikh
*Assistant Examiner* — Jeffrey Mornhinweg
(74) *Attorney, Agent, or Firm* — K&L Gates LLP

(57) ABSTRACT

A dehydrated slice of a vegetable or a fruit is provided, which is adapted to be rehydrated by a rehydration process, having a circumference which is substantially the same as the circumference of the respective slice of the raw vegetable, and having a thickness which is reduced about 20 to 90% in comparison to the thickness of the respective slice of the raw vegetable or fruit. The dehydrated slice has a planar surface. Furthermore, a method is provided to produce said dehydrated slices. Said dehydrated slices are adapted to be rehydrated by a rehydration process herein provided, whereby performance of said process leads to a rehydrated slice with a thickness of the respective raw vegetable or fruit.

27 Claims, 1 Drawing Sheet

OTHER PUBLICATIONS

Mayor, L., Sereno, A. M., "Modelling shrinkage during convective drying of food materials: a review," Journal of Food Engineering 61 (2004) 373-386.*

Prothon, F., Ahrne, L, Sjoholm, I., "Mechanisms and Prevention of Plant Tissue Collapse during Dehydration: A Critical Review," Critical Reviews in Food Science and Nutrition, 43(4): 447-479 (2003).*

"Changes in Structure, Density and Porosity of Potato During Dehydration," by N. Wang & J.G. Brennan, Journal of Food Engineering, vol. 24, No. 1, 1995, pp. 61-67.

"Effect of Hot Air Temperature on Mechanical Properties of Dried Apples," by P.P. Lewicki & E. Jakubczyk, Journal of Food Engineering, vol. 64, No. 3, Sep. 2004, pp. 307-314.

"Physical Changes in Bamboo (*Bambusa phyllostachys*) Shoot During Hot Air Drying: Shrinkage, Density, and Porosity," by P.S. Madamba, Drying Technology, vol. 21, No. 3, 2003, pp. 555-568.

"Structure-Property Relationships in Osmo-Air-Dehydrated Apricot Cubes," by M. Riva et al., Food Research International, Elsevier Applied Science, vol. 38, No. 5, Jun. 2005, pp. 533-542.

"Study of Trehalose Addition on Aroma Retention in Dehydrated Strawberry Puree," by D. Komez, T. Lovric, K. Kovacevic & L. Gracin, Food Technology and Biotechnology, vol. 41, No. 2, pp. 111-119, (2003).

"Stability of Dehydrofrozen Tomatoes Pretreated with Alternative Osmotic Solutes," by E.K. Dermesonlouoglou et al., Journal of Food Engineering, vol. 78, No. 1, Nov. 21, 2005, pp. 272-280.

International Search Report for International Application No. PCT/EP2006/006825 mailed on Apr. 13, 2007.

Written Opinion for International Application No. PCT/EP2006/006825 mailed on Apr. 13, 2007.

Wu, J., et al., "Characteristic Far Red—Ray," Food Science, 19989, vol. 19, No. 8, pp. 26-29, (1998).

Lewicki, P., et al., "Effect of hot air temperature on mechanical properties of dried apples," Journal of Food Engineering, vol. 64, 2004, pp. 307-314, XP002425005.

* cited by examiner

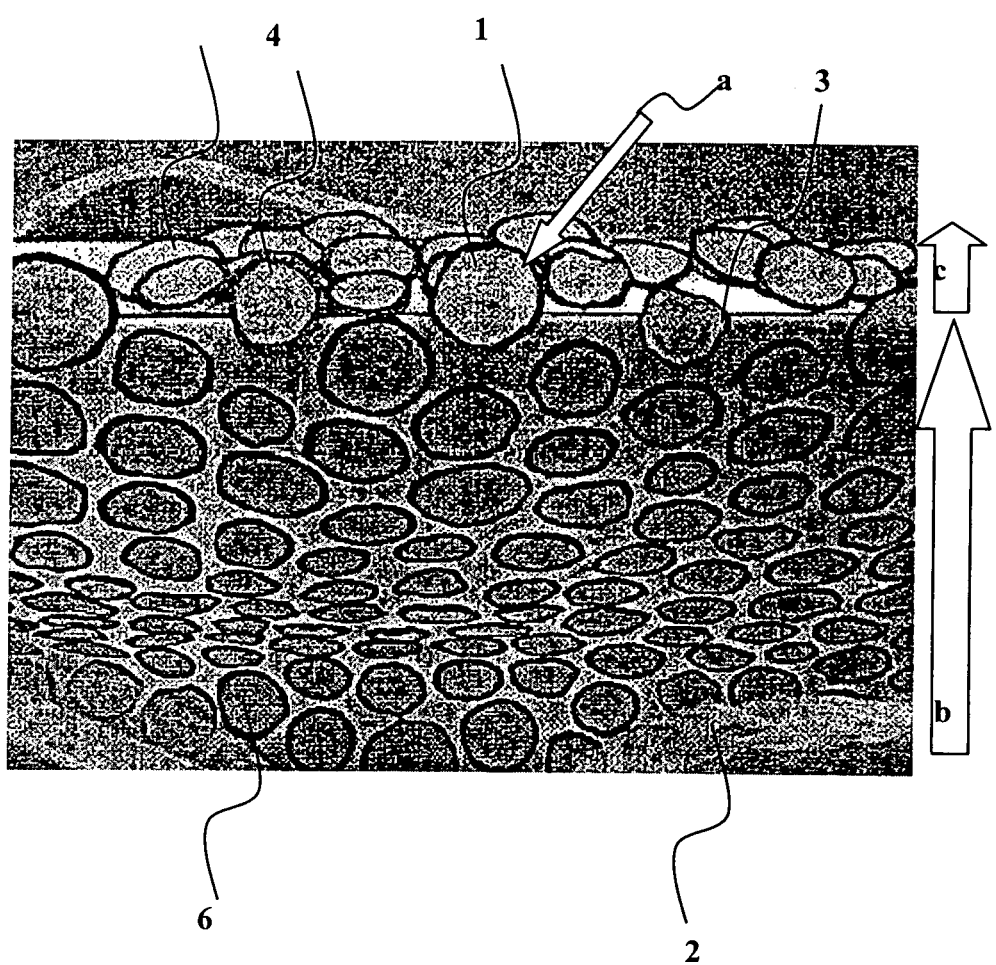

PRESERVED SLICES OF VEGETABLES AND FRUITS AND PROCESSING METHODS

BACKGROUND ART

The present invention relates to dehydrated slices of vegetables and fruits which are adapted e.g. to be re-hydrated under maintenance of their natural appearance, and to a processing method. Such dehydrated slices can also be used in the dried state e.g. as a low-fat snack.

The modern consumers' nutrition habits lately focus more and more on healthy, fresh and tasty food, which should be provided at any time of the day, being quickly prepared to provide a complete and nourishing meal. Food such as soups, sauces and the like shall be prepared fast, requiring only a minimum of preparation steps, tasting or looking freshly prepared at the same time. Accordingly, components such as fruit, vegetables or mushrooms which are provided in convenience products or foods, respectively, shall be processed to permit storage, particularly long-term storage, being maintained naturally and fresh looking and tasty anyway, and, hence, having an esthetic appearance.

Taste, form and properties of processed foods change significantly depending on their processing. A variety of processing methods is known to provide healthy or naturally looking foods.

U.S. Pat. No. 6,977,090 to R. J. Petcavich, teaches methods for preserving the natural color and appearance of fresh and minimally processed produce, aiming to inhibit desiccation or discoloration such as white blushing, e.g., of the processed fruit and vegetables by providing the fruit or vegetable with a trehalose or sugar coating.

A method for non-fry cooking and its uses is taught in US 2005/0013910 to Yasou Takeuchi et al., relating particularly to a method for non-fry cooking, comprising a step of heating and dehydrating a food material using an aqueous trehalose solution with a relatively high temperature and concentration. A non-fried and thus fat reduced product is obtained by the method provided; furthermore an agent for non-fried cooking comprising trehalose as an effective ingredient is disclosed.

In US 2003194479 to Yasou Takeuchi et. al, a process for producing processed foods is disclosed, describing the steps of contacting raw food material(s) with saccharide (s) in a solid or a liquid form, providing the uptake of saccharide(s) by an intact food material. Said process is performed without blanching and then heating the resulting mixture by one or more heating methods selecting form the group consisting of steaming, baking, frying, and microwaving. Takeuchi et al. aim for an effective exertion of flavor and taste of said food materials, and providing a superior preservative stability of the processed material.

However, the vegetables and fruits, or pieces therefrom, preserved by the methods described in the state of the art have sustained a loss of their fresh-looking appearance which is based substantially on three-dimensional shrinkage and rippled surfaces, sometimes accompanied by a change of color. A slice of vegetable, e.g., will—according to a widely known experience—become wrinkled and uneven and potentially brownish after having been subjected to a dehydrating preserving process described in the state of the art.

Extensive shrinkage in all dimensions leads to a hard texture after rehydration, presumably because fibres form compact structures that do not easily take up water and unfold again.

DISCLOSURE OF THE INVENTION

It is an object of the embodiments of the present invention to provide improved dehydrated slices of vegetables or fruits, being adapted to be rehydrated by a rehydration process, and methods to produce said improved rehydrated slices.

The object is solved by the features of the independent claims. Preferred embodiments are shown by the dependent claims.

The embodiments of the present invention refer to dehydrated slices of vegetables or of fruits, which can be subjected to rehydration later on in order to provide a tasty and pleasant looking fruit or vegetable ingredient for a meal. They can also used in the dried state e.g. as a snack. Generally, the dehydrated slices have a circumference which is substantially the same as the circumference of the respective slice of the raw vegetable had been before processing. The dehydrated slices are remarkably reduced with respect to their thickness only, maintaining their planar surface.

Furthermore, the dehydrated slices may comprise additional carbohydrates, which advantageously may provide an increased maintenance of the natural colour of the vegetable or fruit, and which give a structural support, whereby the storing stability, transporting and further processing are facilitated.

One embodiment of the present invention refers to dehydrated zucchini slices, which are fresh looking, having a bright green peel, and having a circular circumference which is approximately the same as the one of the respective fresh zucchini. The surface of said zucchini slice is planar and doesn't show unwanted ripples. The zucchini slices give a pleasant mouthfeel after rehydrating, which is performed quickly and meets the customer's needs.

Furthermore, a method is provided teaching to prepare a dehydrated slice according to the embodiments of the present invention is disclosed, said method referring to the general preparing steps such as cleaning and slicing of the vegetables and fruits, and, furthermore, depicting the steps of heating said slices by methods such as blanching, boiling, steaming, followed by rinsing prior to a single-layer pre-drying and final air drying. The focus of the process is generally laid on the pre-drying, which is carried out when the heated and rinsed slices are carefully arranged on an air-permeable surface, whereby the slices shall not overlap each other in order to provide a homogeneous drying and/or a sticking together of the slices.

The placing on said surface is performed such that shrinkage of the circumference of the slice is prevented, and, hence, the surface is kept plane, without being subjected to undesired wrinkling.

Further embodiments of the method refer to the adding of carbohydrate, preferably to the adding of trehalose, which helps maintaining the fresh color of the vegetable due to its non reducing properties.

Other embodiments of the present invention are related to the rehydrated product, which can be obtained when the dehydrated slices of the embodiments of the present invention are re-moistured.

Another method teaches said rehydrating, whereby the rehydrating parameters are selected to obtain a tasty and naturally looking product.

BRIEF DESCRIPTION OF DRAWINGS

Other objects and many of the attendant advantages of embodiments of the present invention will be readily appreciated and become better understood by reference to the following more detailed description of embodiments in connection with the accompanied drawing. Features that are substantially or functionally equal or similar will be referred to by the same reference signs.

FIG. 1 shows a front side view on an air permeable surface covered with zucchini slices during the processing.

In the description and in the claims which follow, reference will be made to the following terms which shall be defined to have the herewith explained meanings:

"Vegetable" herein means any sort of vegetables and, explicitly, any sort of mushrooms.

"Dehydrating" herein means the process of removing the naturally contained water from food, particularly from vegetables and fruits, such that the natural water content is reduced, whereas "rehydration" is meant to be understood as supplying the dehydrated vegetables and fruits with a liquid. This liquid can be water, alcohol, or any kind of fluid suitable for nutrition and suitable to replace the formerly removed water.

Generally, the product of the embodiments of the present invention is a plane, dehydrated slice of a vegetable or a fruit. Fruits and vegetables of interest may advantageously have an elongated shape, which can easily be cut into slices. Vegetable coming into question are zucchinis, carrots, aubergines (eggplants), turnips, radishes and squash, to name some exemplarily. These vegetable are suitable to give a plurality of slices with similar size, which is most advantageous with respect to an automated producing process on the one hand side, on the other hand, the process of dehydrating of the raw slices is facilitated when an homogeneous drying can be carried out.

The dehydrated slices of a raw vegetable or a raw fruit have the circumference which is substantially the same as the circumference of the respective fresh cut slice of the raw vegetable, but the thickness of the dehydrated slice is reduced. This reduction is roughly proportional to the reduction of the water content and can be about 20 to 95% in comparison to the thickness of the respective slice of the raw vegetable or fruit.

The fresh cut slices have a planar surface which is maintained during dehydration, so that the dehydrated slices have a planar surface, too, which is esthetic looking and free of ripples.

To maintain the healthy appearance of bright colored vegetables as, e.g., zucchini, one may provide the dehydrated slices with an extra amount of carbohydrates, which is added during the processing. The added carbohydrates can advantageously be saccharides, providing a coating of the surface of the slices. Or the slice material might take up the carbohydrate, leading to an impregnation then. The carbohydrates give an additional support to the structure of the food material, accordingly they make the slices more stable and thus easier to transport without damaging. A further advantage is the reduction of discoloring, which may be achieved when the carbohydrate is a non-reducing disaccharide such as e.g. trehalose: a colored peel or skin may be prevented from visible discoloring (browning) when compared to a raw fruit or vegetable.

Other carbohydrates which can be used in addition or alternatively are maltose, erlose, glucose, lactose, maltodextrin or any possible combination and subcombination thereof.

Preferably saccharides with a high glass-transition temperature are used.

The preparation of the dehydrated slices of a raw vegetable and raw fruits may be generally performed by the following method, which comprises the steps: Preparing the raw vegetable or raw fruit, wherein preparing herein means to clean the pieces to be processed, and to sort them, if a plurality of pieces is intended to be processed.

Usually the edges are cut off. Then, the pieces are cut into slices. The thickness of the slices is chosen under consideration of the properties of the food material, in particular with respect to the water contents and structure of the vegetable to be processed: A carrot might advantageously be cut in thinner slices than a zucchini. Zucchini slices, e.g., are advantageously provided having a thickness of about 5 to 8 mm. But even thicker or thinner slices can be processed. Furthermore, the cross sectional shape of the slices might be advantageously a circle, but it can be also desirable to cut slices having a rectangular or any other cross sectional shape, in particular if the slices are required for food-decorating purposes.

Slicing is followed by a heat-treatment which may be performed by a conventional method such as blanching, boiling, and steaming. Advantageously, a gentle method or the method requiring a low temperature, such as blanching, might be chosen in order to keep the cell structure of the food material intact. The boiling, respectively heating, step evaporates air inclusions in the food material, improving thereby the color intensity.

On the other hand the heat-treatment has to soften the tissue and enable the entry of the saccharides. Therefore, the heat treatment has to be done at a temperature which is sufficiently high for these effects.

In the basis method of the herein depicted processing the heating can be followed by pre-drying of said blanched, boiled or steamed slices. Pre-drying is performed in that each slice of the plurality of slices is placed separately, such that the slices do not overlap each other, on an air-permeable surface, which is posed in a drier to provide air drying. The surface should advantageously be adapted to permit application of the slices on it such that they are detachably fixed when the pre-drying is finished. This detachable fixing during the pre-prying provides a shrinking only of the thickness of the slices. A shrinking of the circumference is prevented. The slices maintain their maximum surface; therefore the water removal can be performed easily, quickly and homogeneously. This leads to an advantageous minimization of the drying-time, and, in parallel, provides the esthetic appearance of the slices.

When the pre-drying of the single layer of slices is finished, the drying is finalized by final air drying.

Any known drying method such as e.g. vacuum drying, can be used.

In order to provide an improved stability and preserving of the dehydrated slices, one can refine the above method by an additional step of contacting the slices with carbohydrates. Thereby, a coating of the surface of said slices and/or an impregnation can be provided. The contacting with carbohydrates can be carried out substantially in two ways:

The first way is the one being done during the above described step of boiling, which is carried out as gentle and short as possible, advantageously for 3 to 5 minutes. The carbohydrates during the heat-treatment are already present in the hot or boiling solution, thereby providing a carbohydrate solution. This carbohydrate solution may comprise 20 to 30 weight % of carbohydrates. Even a range from 10 to 40 weight % or 5 to 50% is possible. It is advisable to use a kettle with sieve of fitting dimensions so that the amount of carbohydrate solution needed per kilogram of treated food material is minimum. Monitoring of the carbohydrate solution quality can be done online by refractive index measurements. Refilling of carbohydrates can be done at a critical refractive index value.

Generally, the carbohydrates of the embodiments of the present invention can be saccharides; advantageously one might select non-reducing disaccharides such as trehalose, preventing discoloring of the processed food. Trehalose solutions can be boiled for several hours without substantial browning. This sugar also has a very high glass transition temperature which adds to the shelf stability of the final product.

The second way is the contacting with carbohydrates succeeding to the step of blanching. Blanching, too, is performed as gentle and short as possible, advantageously for about 3 to 5 minutes. Depending on the food material, it may also take longer or shorter.

In any case, it will be carries out until the texture of the material has a desired hardness and bite.

Then, the blanched slices are mixed with a carbohydrate powder or a concentrated solution (such as e.g. a syrup). After said contacting with carbohydrates, in particular after boiling, and prior to the pre-drying, it can be of advantage to rinse the slices with cold water.

The pre-drying step with air in a single layer is of great importance to the quality of the final product. Is advisable to place the slices manually on said air-permeable surface, which may be made from plastics or a similar fabric suitable to be subjected to hot air. This first drying operation can be done during 30 to 120 minutes at a temperature of about 50° C. to 100° C. Advantageously, the dryer has a relatively homogeneous air and heat distribution, since the product cannot be turned during the drying. If necessary, the drying temperature can be reduced and the drying time can be prolonged, until none of the slices suffers heat damage. The pre-drying time may be ranging then from 50 to 120 minutes. The temperature may range from 50° C. to 90° C., if necessary.

The slices get very brittle to the end of the pre-drying step, so they can be detached easily from the air-permeable surface. If the fabric serving as surface is flexible, e.g., nylon or a plurality of other polymeric fabrics, the detaching is facilitated.

Then, the final drying is performed. The slices can be detached from the pre-drying surface and can be re-placed bulk wise, accordingly overlapping, on another air-permeable surface. In order to economize the process, one can arrange a plurality of approximately four permeable surfaces in layers, providing a multi-layer drying. The limiting factor herein is the resistance of air flow which is somewhat lower in more coarse fabrics. The final drying is performed for at least 3 hours, at a temperature of 50 to 80° C., preferably at 60° C. to 70° C. After the drying is finalized, the water activity of the slices is about 0.2 to 0.5, preferably 0.3 to 0.4.

For the final drying any drier can be used as only a small amount of water has to be removed.

After all, in order to be ready to eat, the dehydrated slices should be rehydrated. The consumer may perform re-hydrating himself, if desired or use the slices in the dry state as snacks. Advantageously, one humidifies the dried slices by heating them for about 3 to 4 minutes, again depending in the sort of vegetables or fruits, and on the thickness of the slices. This can be done using a hydrating substance. The most advantageous option is the boiling in water, but one may use as well alcoholic substances, such as wine. Even milk or the like come into question. When the rehydration is done, the thickness of the dehydrated slice is re-extended to almost the thickness of the respective slice of the raw vegetable or fruit, and has now a soft or smooth planar surface.

Referring now to FIG. 1, one can see a portion of zucchini-slices 1 being processed on a flexible nylon tissue 2 as air-permeable surface. The tissue is moved by a not shown conveyor belt. The zucchini slices shown herein result from a medium-dark green, Italian style zucchini with diameter of about 30 to 40 mm, having a cylindrical shape which is advantageous for yield reasons. The slices were cut in whole slices of 5 to 8 mm thickness. This seems very thick, but as the slice is supposed to shrink only in the thickness dimension it will result in a thickness of between 0.5 mm to 1 mm, preferably 1 mm, of the final product.

In order to obtain dehydrated slices, the boiled, carbohydrate-impregnated, separated slices 6 had been be placed on said air-permeable surface 2 in a single layer 6. The carbohydrate addition to the zucchini slices 1 (e.g. 10 to 70% of total dry matter) fortifies the slices 1 mechanically which is positive for detaching (see arrow a) them from the nylon 2, but also later during transport. The dosage of carbohydrate should not be much higher than the dry matter content of the zucchini itself. However, the exact dosage depends on the trip loss on the process.

Using single layers 6 generally increases the drier throughput, leading furthermore to a pre-drying-time of only 60 to 90 minutes. The pre-drying is performed in the zone indicated by the arrow b. Then, the zucchini slices 1 have hardened, so they can be detached (see arrow a) from the nylon 2 by moving over a detaching edge 3. Then, the overlapping slices 4 are subjected to the final drying for about three to five hours, without deformation or shrinkage of the slices 1. The final drying can be carried out as a bulk-drying. The drying is advantageously carried out as a two-step drying, so the formation of the bulk 5 occurs, when the final shape and circumference of the slices 1 is fixed. This keeps the percentage of broken slices 1 during transport low.

The product is an essentially plane, green, dehydrated slice of zucchini, which gives a pleasant, natural texture after three minutes boiling in water for rehydration purposes. Each slice has the diameter of the respective fresh zucchini, because the process does not allow shrinkage in two of the three dimensions. So, the detachably fixed zucchini slices have a larger surface in comparison to conventional drying methods, and therefore an improved water uptake. The addition of sugar also improves rehydration. Only thickness is reduced dramatically by shrinkage. The product is not prone to discoloration during storage at ambient temperatures. The zucchini products are planar whole slices of less than 1 mm thickness, they are not wrinkled, naturally colored, accordingly having a light green color and a dark green peel, without brown areas, showing a reduced tendency to become brown during storage.

The invention claimed is:

1. A dehydrated slice of a vegetable or a fruit having a circumference and a thickness, and being adapted to be rehydrated by a rehydration process, wherein:
   the circumference of the dehydrated slice is the same as a circumference of the respective slice of the vegetable or fruit before the dehydration;
   the thickness of the dehydrated slice is reduced about 20 to 95% in comparison to a thickness of the respective slice of the raw vegetable or fruit; and
   the dehydrated slice has an essentially planar shape, wherein the dehydrated slice comprises an added carbohydrate, and wherein the dehydrated slice has a colored peel or skin that is not visibly discolored in comparison to the peel or skin color of the raw vegetable or the raw fruit.

2. The dehydrated slice according to claim 1, wherein the vegetable is an elongated vegetable.

3. The dehydrated slice according to claim 1, wherein the circumference of the slice is circular in shape.

4. The dehydrated slice according to claim 1, wherein the added carbohydrate is a saccharide.

5. The dehydrated slice according to claim 1, wherein the added carbohydrate is trehalose.

6. The dehydrated slice according to claim 4, wherein said saccharide is selected from the group consisting of maltose, glucose, lactose, maltodextrin, erlose, and combinations thereof.

7. A method of preparing a dehydrated slice of a raw vegetable or a raw fruit, the method comprising:
cutting a vegetable or fruit in a plurality of slices;
subjecting the slices to a water-based heat-treatment by at least one heating method selected from the group consisting of blanching, boiling and steaming;
pre-drying of the heat-treated slices, wherein each slice of the plurality of slices is placed on a first air-permeable surface comprising a flexible fabric such that the slices do not overlap each other, and the slices are detachably fixed to the fabric such that the pre-drying provides a shrinking only of the thickness of the slices and prevents a shrinking of the circumference in comparison to the thickness of the respective slice of the raw vegetable or the raw fruit; and
conducting a final air drying, whereby a dehydrated slice is obtained, with the circumference the same as a circumference of the respective slice of the raw vegetable or fruit, with the thickness reduced about 20 to 95% in comparison to the thickness of the respective slice of the raw vegetable or the raw fruit, and having a planar surface, and being adapted to be rehydrated by a rehydration process, wherein the dehydrated slice has a colored peel or skin that is not visibly discolored in comparison to the peel or skin color of the raw vegetable or the raw fruit.

8. The method according to claim 7, comprising the step of contacting the slices with carbohydrates to provide at least one of a carbohydrate uptake by the slices and a coating of the surface of the slices.

9. The method according to claim 8, wherein the contacting with carbohydrates is performed during the step of boiling, the boiling being carried out for 1 to 7 minutes in a carbohydrate solution.

10. The method according to claim 9, wherein the carbohydrate solution comprises 5 to 50 weight % carbohydrates.

11. The method according to claim 8, wherein the contacting with carbohydrates is performed after the step of blanching, which blanching is performed for 1 to 7 minutes in an aqueous solution, wherein the blanched slices are mixed with a carbohydrate powder.

12. The method according to claim 8, wherein the slices are rinsed with cold water after the contacting with carbohydrates and prior to the pre-drying.

13. The method according to claim 7, wherein the pre-drying is performed for 30 to 120 minutes at a temperature ranging from 50° C. to 100° C.

14. The method according to claim 7, wherein the final air drying is performed after the pre-drying, comprising:
detaching the slices from the first air-permeable surface; and
re-placing the slices on a second air permeable surface, thereby being overlapping slices forming a bulk.

15. The method according to claim 7, wherein the final air drying is performed for at least 3 hours, at a temperature of 50° C. to 80° C.

16. The method according to claim 7, wherein the final air drying can be performed in that a plurality of second surfaces is arranged in layers, thereby providing a multiple-layer final drying.

17. The method according to claim 8, wherein the carbohydrates are saccharides.

18. The method according to claim 14, wherein the first air-permeable surface and the second air-permeable surface are a fabric.

19. The method according to claim 7, wherein the cutting of the slices is performed such that the slices have a thickness ranging from 2 to 9 mm.

20. The method according to claim 7, wherein the steps of the pre-drying and the final air drying result in a water activity of the slices of 0.3 to 0.4.

21. A dehydrated slice of a raw vegetable or a raw fruit, produced by a method of preparing a dehydrated slice of a raw vegetable or a raw fruit, the method comprising:
cutting a vegetable or fruit in a plurality of slices;
subjecting the slices to a water-based heat-treatment by at least one heating method selected from the group consisting of blanching, boiling and steaming;
pre-drying of the heat-treated slices, wherein each slice of the plurality of slices is placed on an air-permeable surface comprising a fabric such that the slices do not overlap each other, and the slices are detachably fixed to the fabric such that the pre-drying provides a shrinking only of the thickness of the slices and prevents a shrinking of the circumference in comparison to the thickness of the respective slice of the raw vegetable or the raw fruit; and
conducting a final air drying, whereby a dehydrated slice is obtained, with the circumference the same as a circumference of the respective slice of the raw vegetable or fruit, with the thickness being reduced about 20 to 95% in comparison to the thickness of the respective slice of the raw vegetable, and having a planar surface, and being adapted to be rehydrated by a rehydration process, wherein the dehydrated slice has a colored peel or skin that is not visibly discolored in comparison to the peel or skin color of the raw vegetable or the raw fruit.

22. A method for obtaining a rehydrated slice of a vegetable or a fruit, the method comprising:
hydrating a dehydrated slice of a vegetable or a fruit, having a circumference and a thickness, and being adapted to be rehydrated by a rehydration process, the circumference of the dehydrated slice is the same as a circumference of the respective slice of the vegetable or fruit before the dehydration, the thickness of the dehydrated slice is reduced about 20 to 95% in comparison to a thickness of the respective slice of the raw vegetable or fruit, and the dehydrated slice has an essentially planar shape, wherein the dehydrated slice has a colored peel or skin that is not visibly discolored in comparison to the peel or skin color of the raw vegetable or the raw fruit.

23. A method for obtaining a rehydrated slice of a vegetable or a fruit, the method comprising:
hydrating a dehydrated slice of a vegetable or a fruit, having a circumference and a thickness, and being adapted to be rehydrated by a rehydration process, the circumference of the dehydrated slice is the same as a circumference of the respective slice of the vegetable or fruit before the dehydration, the thickness of the dehydrated slice is reduced about 20 to 95% in comparison to a thickness of the respective slice of the raw vegetable or fruit, and the dehydrated slice has an essentially planar shape by subjecting it to a hydrating substance, whereby re-extending of the thickness of the dehydrated slice to almost the thickness of the respective slice of the raw vegetable or the raw fruit is performed, and the rehydrated slices planar surface become softer, wherein the dehydrated slice has a colored peel or skin that is not visibly discolored in comparison to the peel or skin color of the raw vegetable or the raw fruit.

24. The method according to claim 23, wherein the hydrating substance is selected from the group consisting of water, alcohol, any water containing liquid suitable for nutrition, and combinations thereof.

25. The method according to claim 23, wherein the hydrating is performed by subjecting the dehydrated slice for at least 3 minutes to the rehydrating substance.

26. A rehydrated slice of a processed vegetable or a processed fruit obtained by a method of rehydrating a slice of a vegetable or a fruit, the method comprising:
hydrating a vegetable or a fruit having a circumference and a thickness, the dehydrated slice adapted to be rehydrated by a rehydration process:
the circumference of the dehydrated slice is the same as a circumference of the respective slice of the vegetable or fruit before the dehydration;
the thickness of the dehydrated slice is reduced about 20 to 95% in comparison to a thickness of the respective slice of the raw vegetable or fruit; and
the dehydrated slice has an essentially planar shape by subjecting it to a hydrating substance, whereby re-extending of the thickness of the dehydrated slice to almost the thickness of the respective slice of the raw vegetable or the raw fruit is performed, and the rehydrated slice's planar surface being softer and having a circumference that is substantially the same as a the circumference of the respective slice of the raw vegetable or fruit and being smooth , wherein the dehydrated slice has a colored peel or skin that is not visibly discolored in comparison to the peel or skin color of the raw vegetable or the raw fruit.

27. A dehydrated slice of a vegetable or fruit comprising:
a circumference that is the same as a circumference of the respective slice of the vegetable or fruit before the dehydration, and
the thickness of the dehydrated slice is about 20 to 95% of the thickness of the respective slice of the raw vegetable or fruit, wherein the dehydrated slice comprises an added carbohydrate, and wherein the dehydrated slice has a colored peel or skin that is not visibly discolored in comparison to the peel or skin color of the raw vegetable or the raw fruit.

* * * * *